Jan. 21, 1936. E. E. HALL 2,028,601
TIRE AND RIM CONSTRUCTION
Filed Sept. 15, 1932
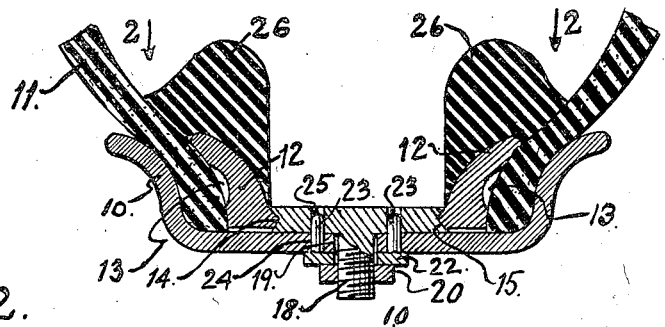
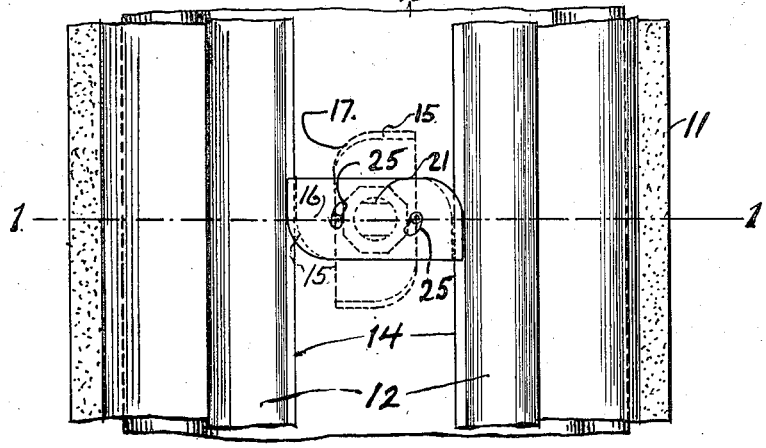
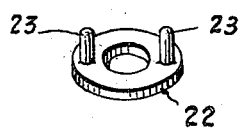
Inventor:
Eric E. Hall,
by John Howard McElroy,
his Attorney.

Patented Jan. 21, 1936

2,028,601

UNITED STATES PATENT OFFICE 2,028,601

TIRE AND RIM CONSTRUCTION

Eric E. Hall, Chicago, Ill.

Application September 15, 1932, Serial No. 633,318

4 Claims. (Cl. 152—20)

My invention is concerned with pneumatic tires, and more especially with the rim construction by which the outer casings are secured in place, and consists in certain novel combinations of elements which are designed to prevent the casing from being detached from the rim in case of a blowout.

As tires and rims are usually constructed, the outer casing is held in place solely by the air pressure of the inflated inner tube, and many accidents have occurred due to a puncture which has released the air pressure and permitted the outer casing to be detached from the rim, a condition that may cause a bad wreck if the car is traveling at any considerable rate of speed, and especially if it is a front wheel that is involved.

To illustrate my invention, I annex hereto a sheet of drawing, in which the same reference characters are used to designate identical parts in all the figures, of which,—

Fig. 1 is a cross section of a tire and rim embodying my invention, the inner tube being omitted, and the section being taken on the line 1—1 of Fig. 2;

Fig. 2 is a plan view as seen in section on the line 2—2 of Fig. 1; and

Fig. 3 is a separate view of the locking plate.

In carrying out my invention, any desired form of the rim 10 may be employed, and I have illustrated a common design, and any desired form of the outer casing 11 may be employed, and as these tires have been customarily constructed prior to my invention, the casing 11 has been held in place simply by the pressure of the air on the inner tube, not shown, which, when inflated, fills all the space inside of the outer casing and engages its interior and the portion of the rim between the edges of the casing, so that the air pressure holds the outer casing securely in place. However, when a puncture occurs, and the inner tube is deflated, there is nothing to prevent the flattening of the outer casing, with the result that its edges are freed from the rim, and it may be readily completely detached therefrom, especially if the car is traveling at a high rate of speed when the deflation occurs.

To remedy this difficulty, I employ a pair of rings 12, which are preferably symmetrical, and, as shown, serve to engage the inner, lower edge of the standard casing, and to rest adjacent the outer surface of the rim 10. The surfaces of these rings which engage the casing may have the annular grooves 13 therein, which, where the standard inner casing is employed, will serve to give a somewhat better grip on the same. I form them, at their lower inner edges, with the ribs 14, which ribs are engaged by the grooves 15 formed on the ends of the plurality of securing plates 16, of which as many may be employed as desired, preferably four for each tire. These plates 16 are preferably rectangular in their general shape, but have the opposite corners thereof rounded off, as seen at 17, to produce a cam surface that will engage the rings 12 and force them securely against the edges of the outer casing 11 when the plate is swung to the full-line position of Fig. 2. These plates are provided with bearing pins 18 extending downwardly from the center thereof through the aperture 19 in the rim, and have a portion adjacent their lower ends threaded to receive the nut 20 by which they are secured in place, and their extreme lower ends are preferably flattened, as seen at 21, so that a wrench can be applied thereto to turn them into the securing position.

While the shape of the plate with its cam surface will ordinarily be sufficient to hold the rims securely in their place, I preferably employ locking means to hold the plate 16 in its securing position, and, for this purpose, I mount on the pin 18, just below the rim 10, a locking plate 22, which may be generally oblong in its shape, and is provided with a pair of pins 23 projecting upwardly therefrom and extending through apertures 24 in the rim and into apertures 25 in the cam plate 16, these apertures being preferably slightly elongated and on a curve with the bearing pin as a center. When the outer casing with the inner tube is in place, with the securing plate 16 in the position shown in dotted lines in Fig. 2, it is then turned to the full-line position and the locking plate is applied, and the nut 20 screwed in place, and the parts thus secured, so that it is impossible to detach the outer casing from the rim without unlocking it and turning the securing plate to the releasing dotted-line position shown in Fig. 2.

As will be seen from Fig. 1, I preferably design and adjust the rings 12 so that they are not in actual contact with the rim, but have a slight clearance, so that if water should work in underneath the casing, the rings will not rust to the rim and make their ultimate removal when the tire has to be changed difficult. To do this and prevent the possibility of the wheel becoming unbalanced due to the rings possibly touching at one point and being spaced away twice the clearance distance at 180° therefrom, the grooves 15 on the ends of the securing plates 16 co-operating with the ribs 14 on the rings 12 are essential, as without them, there would be nothing to prevent the rings assuming the eccentric position noted irrespective of the adjustment of the securing plates.

An additional feature of my invention resides in the provision of the rings 12 with rubber extensions 26, cemented thereto, and preferably shaped as shown in cross section in Fig. 1. These extensions serve the useful purpose of protecting to a considerable extent the casing and inner tube from being cut and otherwise damaged when the car runs with a tire in the deflated condition.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a tire and rim construction, the combination with a generally U-shaped rim, of an outer casing having its edges adapted to fit against the inner sides of the rim, a plurality of cam plates mounted in the rim and adapted to be turned into position to secure the casing in the rim, and means for locking the plates in their securing position, said means consisting of a plate for each of the cam plates secured on the inner side of the rim and having a pin extending through an aperture in the rim and into an aperture in the cam plate which registers with the aperture in the rim when the cam plate is in securing position.

2. In a tire and rim construction, the combination with a generally U-shaped rim, of an outer casing having its edges adapted to fit against the inner sides of the rim, a pair of rings on the rim between the edges of the casing, and a plurality of securing members mounted in the rim and adapted to be moved into position to clamp the edges of the casing between the rings and the inner sides of the rim, said rings having elastic extensions secured thereto and projecting beyond the edges of the rim, for the purpose described.

3. In a tire and rim construction, the combination with a generally U-shaped rim, of an outer casing having its edges adapted to fit against the inner sides of the rim, a pair of rings on the rim between the edges of the casing, and a plurality of securing members mounted in the rim and adapted to be moved into position to clamp the edges of the casing between the ring and the inner sides of the rim, said rings having rubber extensions cemented to their inner surfaces and projecting beyond the edges of the rim, for the purpose described.

4. In a tire and rim construction, the combination with a generally U-shaped rim, of an outer casing having its edges adapted to fit against the inner sides of the rim, a plurality of securing members mounted in the rim and adapted to be moved into position to secure the casing in the rim, said securing members consisting of generally rectangular plates pivotally mounted in the rim and having cam surfaces on their ends, said plates having a centrally located bearing pin extending through an aperture in the rim and secured by a nut threaded on the pin, and locking means for said plates consisting of a plate for each of the rectangular plates secured on the inner side of the rim by being mounted on the bearing pin and having a pin extending through an aperture in the rim and into an aperture in the cam plate which registers with the aperture in the rim when the cam plate is in securing position.

ERIC E. HALL.